US 12,123,958 B2

(12) United States Patent
Acheson

(10) Patent No.: US 12,123,958 B2
(45) Date of Patent: Oct. 22, 2024

(54) BATCH PROCESSING SIGNAL ACQUISITION

(71) Applicant: BAE SYSTEMS Information and Electronic Systems Integration Inc., Nashua, NH (US)

(72) Inventor: John E. Acheson, Anamosa, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 143 days.

(21) Appl. No.: 17/978,590

(22) Filed: Nov. 1, 2022

(65) Prior Publication Data
US 2024/0142635 A1    May 2, 2024

(51) Int. Cl.
| G01S 19/37 | (2010.01) |
| G01S 19/29 | (2010.01) |
| H04B 1/709 | (2011.01) |
| H04B 1/713 | (2011.01) |

(52) U.S. Cl.
CPC .............. *G01S 19/37* (2013.01); *G01S 19/29* (2013.01); *H04B 1/709* (2013.01); *H04B 1/713* (2013.01)

(58) Field of Classification Search
CPC .................... H04B 1/709; H04B 1/713; H04B 2001/6904; H04B 2001/6908; H04B 2001/71566; G01S 19/24; G01S 19/25; G01S 19/29; G01S 19/31; G01S 19/35; G01S 19/37
USPC .............. 375/132, 134, 137, 138, 147, 150; 342/90, 190, 195; 370/335, 342
See application file for complete search history.

(56) References Cited

U.S. PATENT DOCUMENTS

| 5,761,160 | A  | * | 6/1998 | Sanada | G11B 27/002 |
| 6,295,024 | B1 |   | 9/2001 | King et al. | |
| 6,300,899 | B1 |   | 10/2001 | King | |
| 2004/0225863 | A1 | * | 11/2004 | Yamashita | G11B 27/034 |
| 2005/0158025 | A1 | * | 7/2005 | Shinkai | H04N 9/8205 386/E9.036 |
| 2010/0178026 | A1 | * | 7/2010 | Ogasawara | H04N 21/4147 386/207 |
| 2012/0306696 | A1 |   | 12/2012 | Warloe et al. | |
| 2013/0058619 | A1 | * | 3/2013 | Miyakawa | H04N 9/8205 386/E5.052 |

(Continued)

OTHER PUBLICATIONS

International Search Report, PCT/US23/78262, mailed Mar. 5, 2024, 8 pages.

*Primary Examiner* — Young T. Tse
(74) *Attorney, Agent, or Firm* — Gary McFaline

(57) ABSTRACT

Techniques are provided for batch processing signal acquisition. A batch processing signal acquisition system implementing the techniques according to an embodiment includes a recording controller configured to store samples of an input signal to a memory. The input signal is received at a first sampling rate. The system also includes a playback controller configured to read samples from the memory for playback of the input signal at a second sampling rate. The system further includes an acquisition processor configured to detect and locate, in time and frequency, a signal of interest in the playback of the input signal. The system further includes a signal processor configured to process the signal of interest in the playback of the input signal based on the detection and location provided by the acquisition processor.

20 Claims, 6 Drawing Sheets

(56) References Cited

U.S. PATENT DOCUMENTS

| | | | |
|---|---|---|---|
| 2013/0207641 A1* | 8/2013 | Timm | G01R 13/0272 |
| | | | 324/121 R |
| 2013/0231882 A1* | 9/2013 | Yu | G01R 13/0236 |
| | | | 702/67 |
| 2016/0118079 A1* | 4/2016 | Washino | H04N 5/91 |
| | | | 348/445 |
| 2017/0350985 A1 | 12/2017 | Agee | |
| 2021/0190897 A1 | 6/2021 | Cribbs et al. | |

* cited by examiner

BATCH PROCESSING SIGNAL ACQUISITION

FIELD OF DISCLOSURE

The present disclosure relates to signal acquisition, and more particularly, to a batch processing signal acquisition system for diverse waveforms.

BACKGROUND

There are numerous situations, particularly in military applications, where signals that contain sensitive or confidential information need to be transmitted. These signals are often designed to be difficult to detect and decode. Receivers of such signals typically employ signal acquisition systems that are computationally complex, large, power intensive, and expensive.

Figure 1:
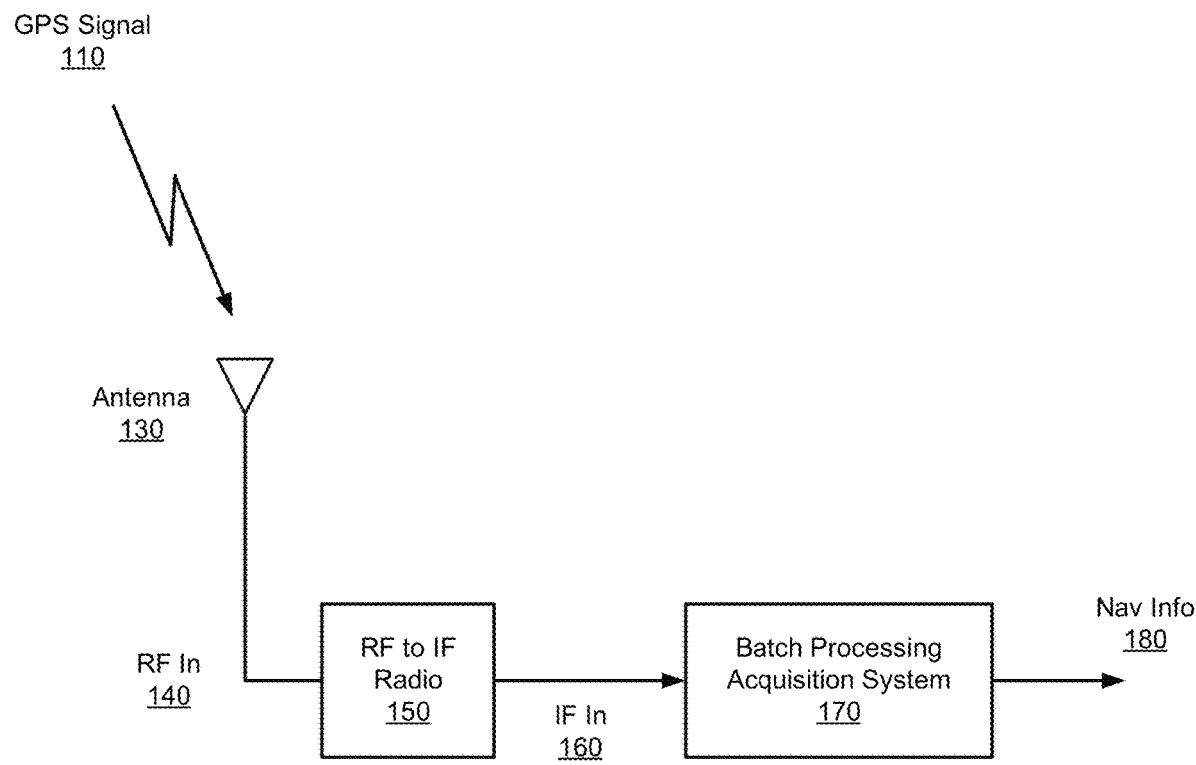
FIG. 1 illustrates an implementation of a batch processing acquisition system employed in a navigation system, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for batch processing signal acquisition. As noted previously, many types of signals are designed to be difficult to detect and decode. One such example is a military global positioning system (GPS) signal which employs frequency hopping techniques with a non-repeating random code sequence to increase the difficulty of signal acquisition. Attempting to acquire the signal by searching through a range of time and frequency regions requires significant computational power and is relatively time consuming. By the time that the signal acquisition is accomplished, the signal may have passed or changed so that a new acquisition is needed.

To this end, and in accordance with an embodiment of the present disclosure, a batch processing signal acquisition system is disclosed which provides for storage of a received signal to memory in real-time (e.g., at a sampling rate sufficient to timely capture the signal as it is received), and playback of the stored signal from memory to multiple processors at a significantly faster sampling rate (e.g., hundreds of times faster). One or more of these processors are configured to perform acquisition of a signal of interest that may be contained in the received signal. Other processors are configured the decode the signal of interest based on the discovered acquisition parameters (e.g., knowledge of the time and frequency offsets provided by the acquisition processors). In some embodiments, the acquisition processors search through a range of time and frequency regions of the playback signal at the higher sampling rate to determine the frequency hopping sequence. The decoding processors can then use this information to decode the signal of interest contained in the playback of the same recorded signal with which the acquisition processors worked. In some embodiments, the signal of interest is a code-division multiple access (CDMA) signal, and the decoding processors are configured to de-spread the signal.

The disclosed techniques can be implemented, for example, in a gate-level logic device, a microprocessor, an embedded processor, or a software product executable or otherwise controllable by such processing systems, although other embodiments will be apparent in light of this disclosure. In accordance with an embodiment, a batch processing signal acquisition system implementing the techniques includes a recording controller configured to store samples of an input signal to a memory. The input signal is received at a first sampling rate. The system also includes a playback controller configured to read samples from the memory for playback of the input signal at a second sampling rate that is higher than the first sampling rate. The system further includes an acquisition processor configured to detect and locate, in time and frequency, a signal of interest in the playback of the input signal. The system further includes a signal processor configured to process the signal of interest in the playback of the input signal based on the detection and location provided by the acquisition processor.

It will be appreciated that the disclosed techniques for batch processing signal acquisition, as described herein, may provide faster and more reliable acquisition of frequency hopped (or other difficult to detect) signals, compared to existing techniques that attempt to analyze signals in real-time. The techniques disclosed herein may further be implemented in hardware or software or a combination thereof. Numerous embodiments and applications will be apparent in light of this disclosure.

System Architecture

FIG. 1 illustrates an implementation 100 of a batch processing acquisition system employed in a navigation system, in accordance with an embodiment of the present disclosure. As shown in this implementation, an antenna 130 is configured to receive GPS signals 110. The implementation also shows a radio 150 which is configured to convert the received RF signal 140 down to an intermediate frequency (IF) signal 160 to be provided to the batch processing acquisition system 170.

The batch processing acquisition system 170 will be described in greater detail below, but at a high level the system is configured to collect signal samples in real-time (e.g., at near real-time sampling rates) and store the samples in memory for subsequent batch processing at higher sampling rates by one or more acquisition and decoding processors. In this example, the signal may be a military GPS signal and the acquisition processor is configured to determine the frequency hopping sequence so that the decoding processor can de-spread the encoded CDMA signal to provide GPS navigation information 180.

Figure 2:
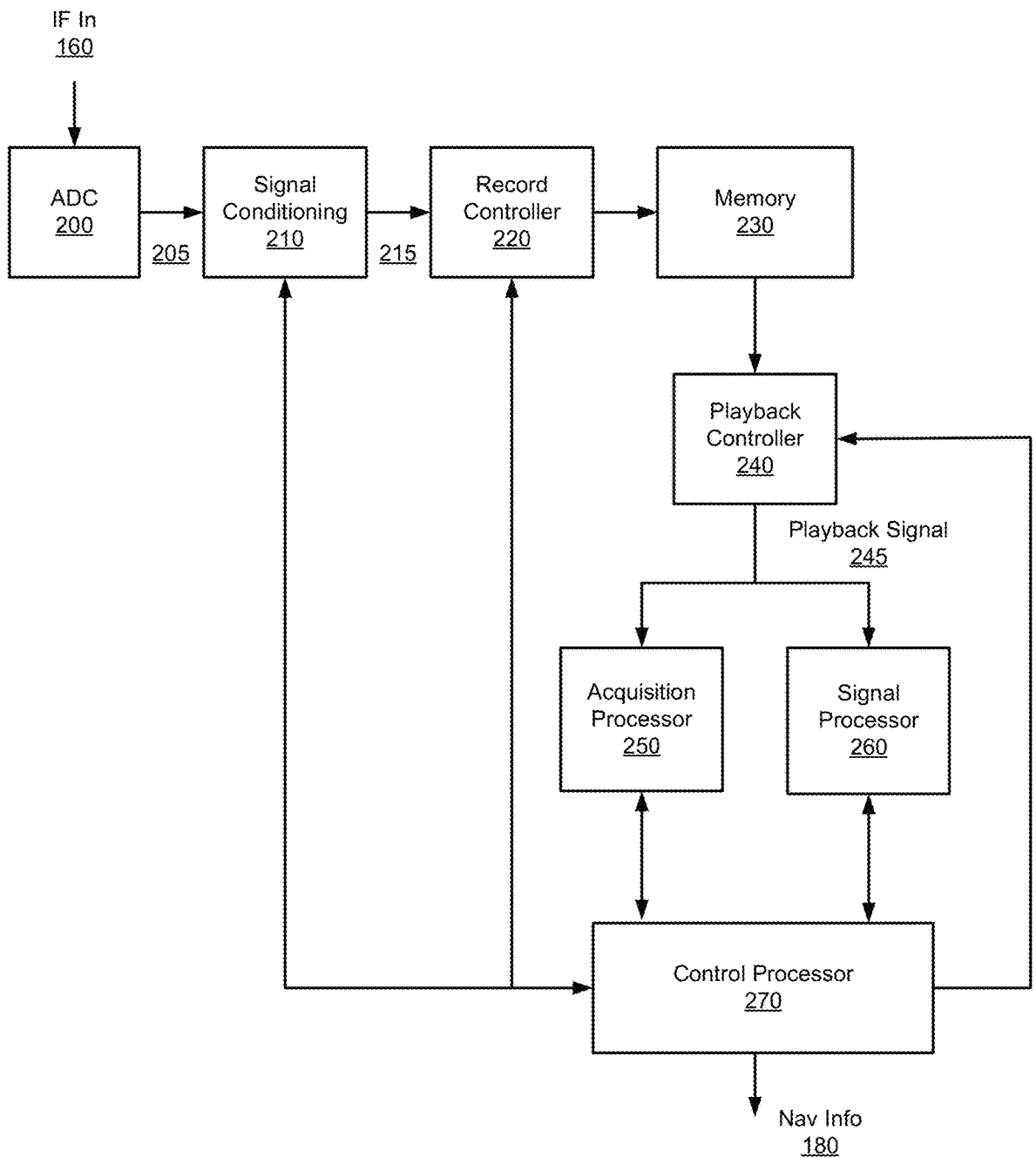
FIG. 2 is a block diagram of the batch processing acquisition system of FIG. 1, configured in accordance with an embodiment of the present disclosure.

FIG. 2 is a block diagram of the batch processing acquisition system 170 of FIG. 1, configured in accordance with an embodiment of the present disclosure. The batch processing acquisition system 170 is shown to include an analog to digital converter (ADC) 200, a signal conditioning circuit 210, and record controller 220, a memory 230, a playback controller 240, an acquisition processor 250, a signal processor 260, and a control processor 270.

The ADC 200 is configured to convert the analog IF input signal 160 into a digital IF signal 205 at a first sampling rate. The first sampling rate is selected to capture the received analog IF input signal 160 based on the bandwidth of the IF signal (e.g., based on the Nyquist frequency). In some embodiments, the first sampling rate may be in the range of 5 MHz to 20 MHz.

The signal conditioning circuit 210 is configured to perform any desired filtering or gain adjustments on the digital IF signal 205. In some embodiments, the signal conditioning circuit 210 may also format the conditioned digital IF signal 215 into any desired record format that is convenient for storage in memory 230. In some embodiments, for example, the conditioned digital IF signal 215 may be formatted into records of 1024 32 bit words.

The record controller 220 is configured to store the samples (or records) of the conditioned digital IF signal 215 to the memory 230 so that the samples are written to the memory at the first sampling rate. In some embodiments, the record controller may begin storing samples in response to a trigger provided by the control processor 270. In some embodiments, the record controller 220 may buffer sample data into blocks and write those blocks to the memory using a direct memory access (DMA) technique. In some embodiments, the memory 230 may be configured to store on the order of 500 Mbytes of data or more.

The playback controller 240 is configured to read samples from the memory 230 for playback of the conditioned digital IF signal 215 at a second sampling rate. For simplicity, the conditioned digital IF signal 215 will be referred to hereinafter as the input signal. In some embodiments, the second sampling rate is faster than the first sampling rate by a factor in the range of 100 to 300. In some embodiments, the second sampling rate is in the range of 100 MHz to 400 MHz. In some embodiments, the playback controller 240 may begin playing back samples in response to a trigger provided by the control processor 270.

Operation of the acquisition processor 250 will be described in greater detail below, but at a high level, the acquisition processor 250 is configured to detect and locate, in time and frequency, a signal of interest within the playback of the input signal. In some embodiments, the signal of interest is a frequency hopping waveform and the acquisition processor is a frequency hop detector.

Operation of the signal processor 260 will be described in greater detail below, but at a high level, the signal processor 260 is configured to process the signal of interest in the playback of the input signal based on the detection and location provided by the acquisition processor 250. In some embodiments, the signal processor is a code-division multiple access (CDMA) correlator configured to de-spread the signal of interest.

The control processor 270 is configured to set the first and second sampling rates, trigger the record controller to start storing samples to the memory, trigger the playback controller to start reading samples from the memory, and to coordinate operation between the playback controller, the acquisition processor, and the signal processor. In some embodiments, the signal of interest is a frequency hopped GPS signal and the control processor is configured to process the de-spread CDMA signal of interest to generate navigation information (e.g., time, position, and motion).

In some embodiments, additional signal processing engines may be employed (e.g., in addition to acquisition processor 250 and signal processor 260) to perform other desired processing on the playback signal 245. For example, narrowband signal processors may be employed to process other narrowband signals of interest and/or other acquisition processors may be employed to acquire other signals of interest.

In some embodiments, the processors, controllers, and/or memory may be implemented as application-specific integrated circuits (ASICs) field programmable gate arrays (FPGAs).

Figure 3:
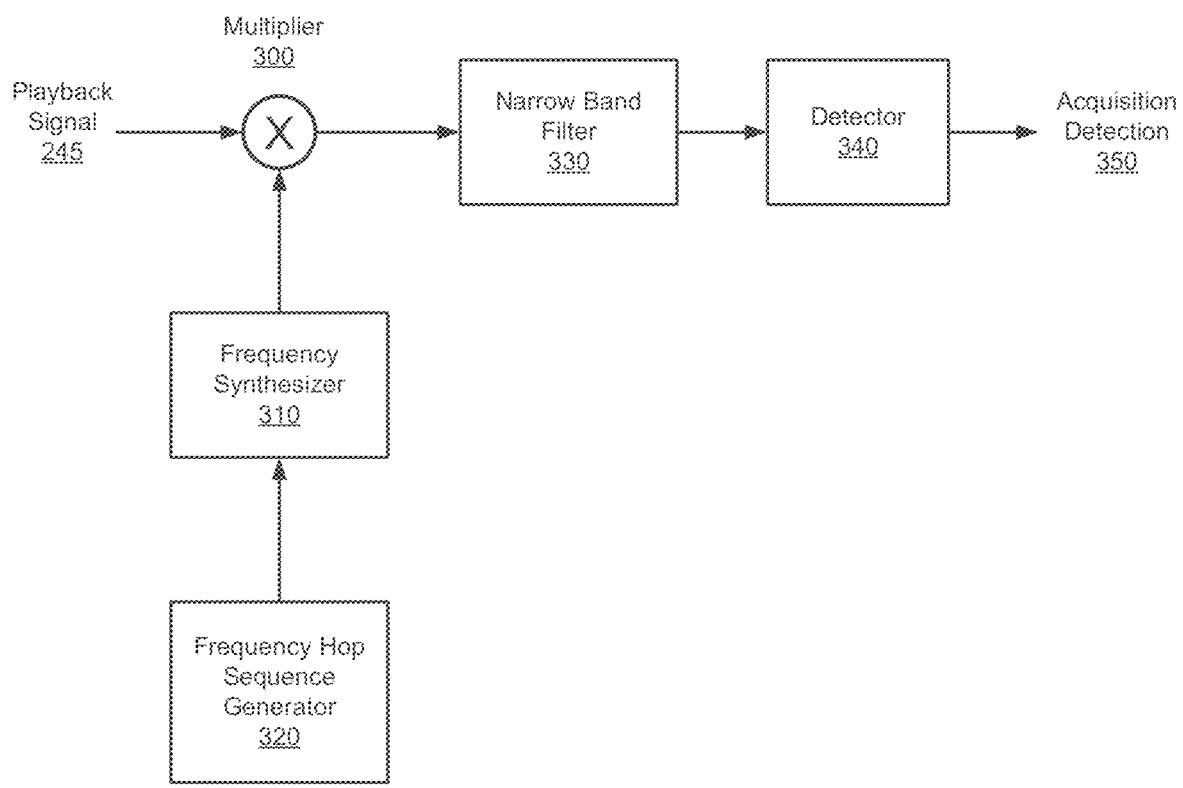
FIG. 3 is a block diagram of the acquisition processor of FIG. 2, configured in accordance with an embodiment of the present disclosure.

FIG. 3 is a block diagram of the acquisition processor 250 of FIG. 2, configured in accordance with an embodiment of the present disclosure. The acquisition processor 250 may use any suitable signal acquisition techniques, in light of the present disclosure, to operate on the playback signal 245 to acquire the signal of interest. The acquisition processor 250 of this example is configured to acquire a frequency hopped signal of interest and is shown to include a frequency hop sequence generator 320, a frequency synthesizer 310, a multiplier 300, a narrow band filter 330, and a detector 340.

The frequency hop sequence generator 320 is configured to generate a sequence of frequency values over a series of time periods. These frequencies and time periods define the frequency/time domain over which the search for the frequency hopping signal of interest will be performed.

The frequency synthesizer 310 is configured to generate consecutive tone signals at each of the frequencies in the sequence specified by the frequency hop sequence generator 320.

The multiplier 300 is configured to multiply the playback signal 245 by the generated tone signals to frequency translate the playback signal at each frequency hop. The narrow band filter 330 is configured to filter the frequency translated playback signal to a bandwidth associated with each frequency hop. In some embodiments, the bandwidth of a frequency hop may be on the order of 200-300 Hertz.

The detector 340 is configured to analyze the filtered and frequency translated playback signal to determine if the signal of interest is present. If present, the detector generates an acquisition detection 350 which provides the frequency and time slot in which the signal of interest was detected.

The relatively fast playback sampling rate allows the playback signal to be repeatedly replayed to the acquisition processor for analysis with different time and frequency offsets in the search for the signal of interest.

Figure 4:
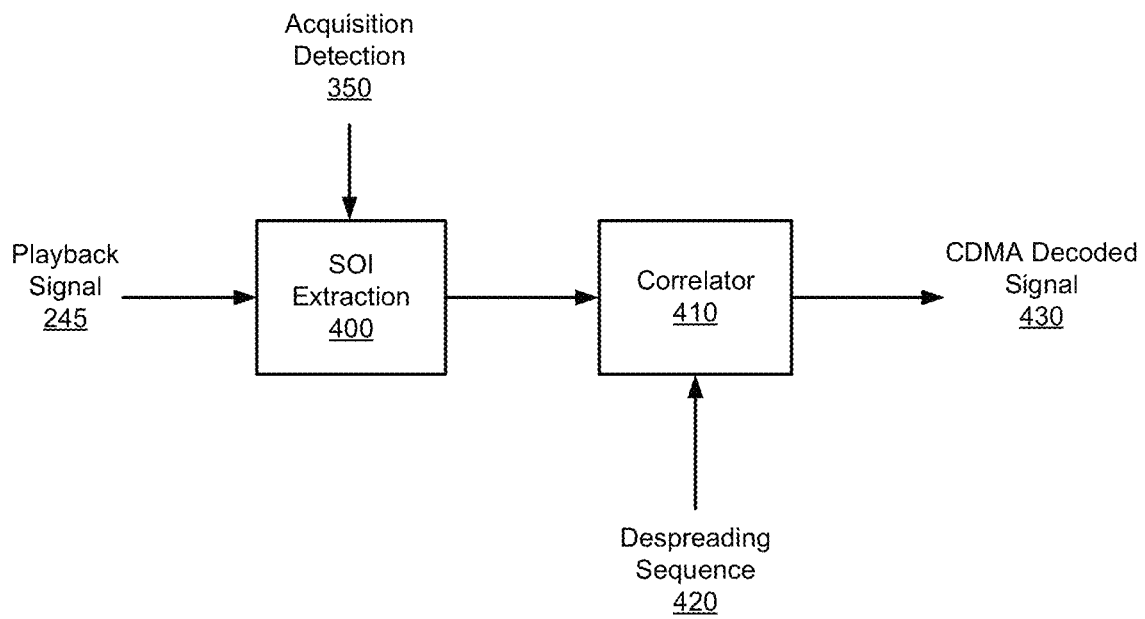
FIG. 4 is a block diagram of the signal processor of FIG. 2, configured in accordance with an embodiment of the present disclosure.

FIG. 4 is a block diagram of the signal processor 260 of FIG. 2, configured in accordance with an embodiment of the present disclosure. The signal processor 260 may use any suitable signal processing techniques, in light of the present disclosure, to decode the signal of interest from the playback signal 245. The signal processor 260 of this example is configured to process a CDMA encoded signal of interest (e.g., a frequency hopped GPS signal) and is shown to include a signal of interest extractor 400 and a correlator 410.

The signal of interest extractor 400 is configured to extract the signal of interest from the playback signal 245 using the frequency and time information provided by the acquisition detection 350. For example, in some embodiments, a segment or time slice of the signal may be extracted from the playback signal based on the time information provided by the acquisition detection, and then that segment may be frequency translated and filtered based on the frequency information provided by the acquisition detection.

The correlator 410 is configured to apply a CDMA de-spreading sequence 420 to the extracted signal of interest to generate a CDMA decoded signal 430. An advantage of this system is that the signal processor 260 operates on the same playback signal 245 (e.g., the same samples) that was used by the acquisition processor, so there is no concern that the frequency hopping sequence may have changed in the interim.

Methodology

Figure 5:
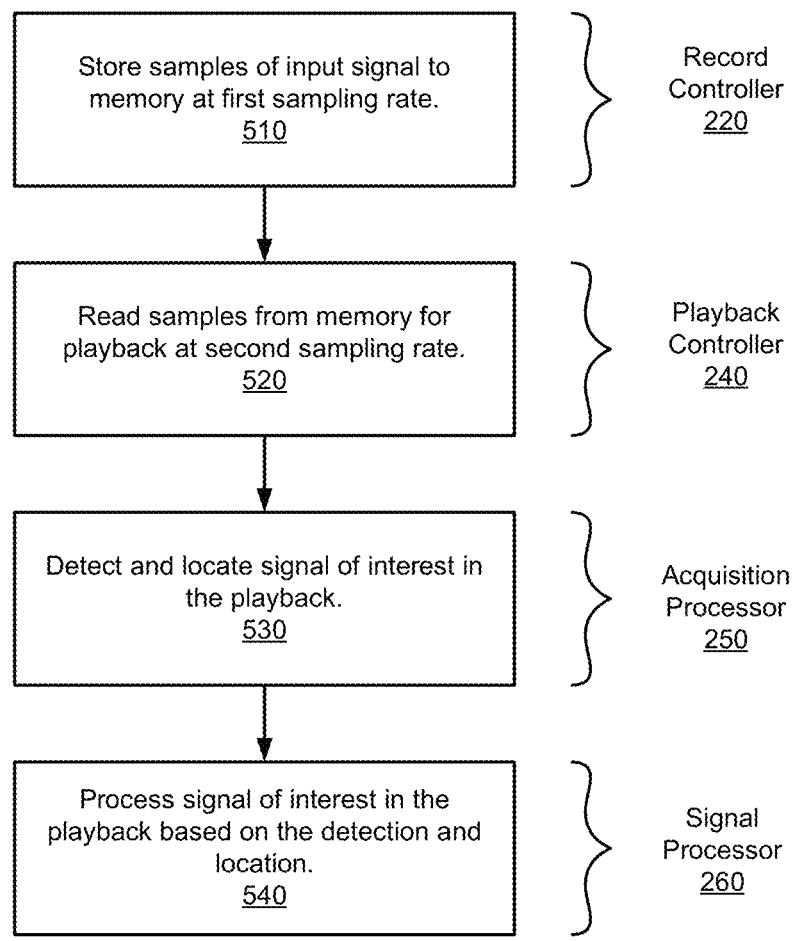
FIG. 5 is a flowchart illustrating a methodology for batch processing signal acquisition, in accordance with an embodiment of the present disclosure.

FIG. 5 is a flowchart illustrating a methodology 500 for batch processing signal acquisition, in accordance with an embodiment of the present disclosure. As can be seen, the example method includes a number of phases and sub-processes, the sequence of which may vary from one embodiment to another. However, when considered in the aggregate, these phases and sub-processes form a process for batch processing signal acquisition, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIG. 5 to the specific components illustrated in FIGS. 1-4, is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 5, in one embodiment method 500 commences, at operation 510, by storing samples of an input signal to a memory. The input signal is received at a first sampling rate.

Next, at operation 520, samples are read from the memory for playback of the input signal at a second sampling rate. In some embodiments, the second sampling rate is faster than the first sampling rate by a factor in the range of 100 to 300. In some embodiments, the first sampling rate is in the range of 5 MHz to 20 MHz, and the second sampling rate is in the range of 100 MHz to 400 MHz.

At operation 530, a signal of interest contained in the playback of the input signal is detected and located, in time and frequency. In some embodiments, the signal of interest is a frequency hopping waveform and the detection and location is performed by a frequency hop detector acquisition processor. In some embodiments, the signal of interest is a frequency hopped GPS signal.

At operation 540, the signal of interest in the playback of the input signal is processed based on the detection and location provided by the acquisition processor. In some embodiments, the signal of interest is a CDMA signal, and the processing includes de-spreading the signal of interest Of course, in some embodiments, additional operations may be performed, as previously described in connection with the system. For example, a trigger may be supplied to initiate the storing of samples to the memory and/or to initiate the playback of samples from the memory.

Example Systems

Figure 6:
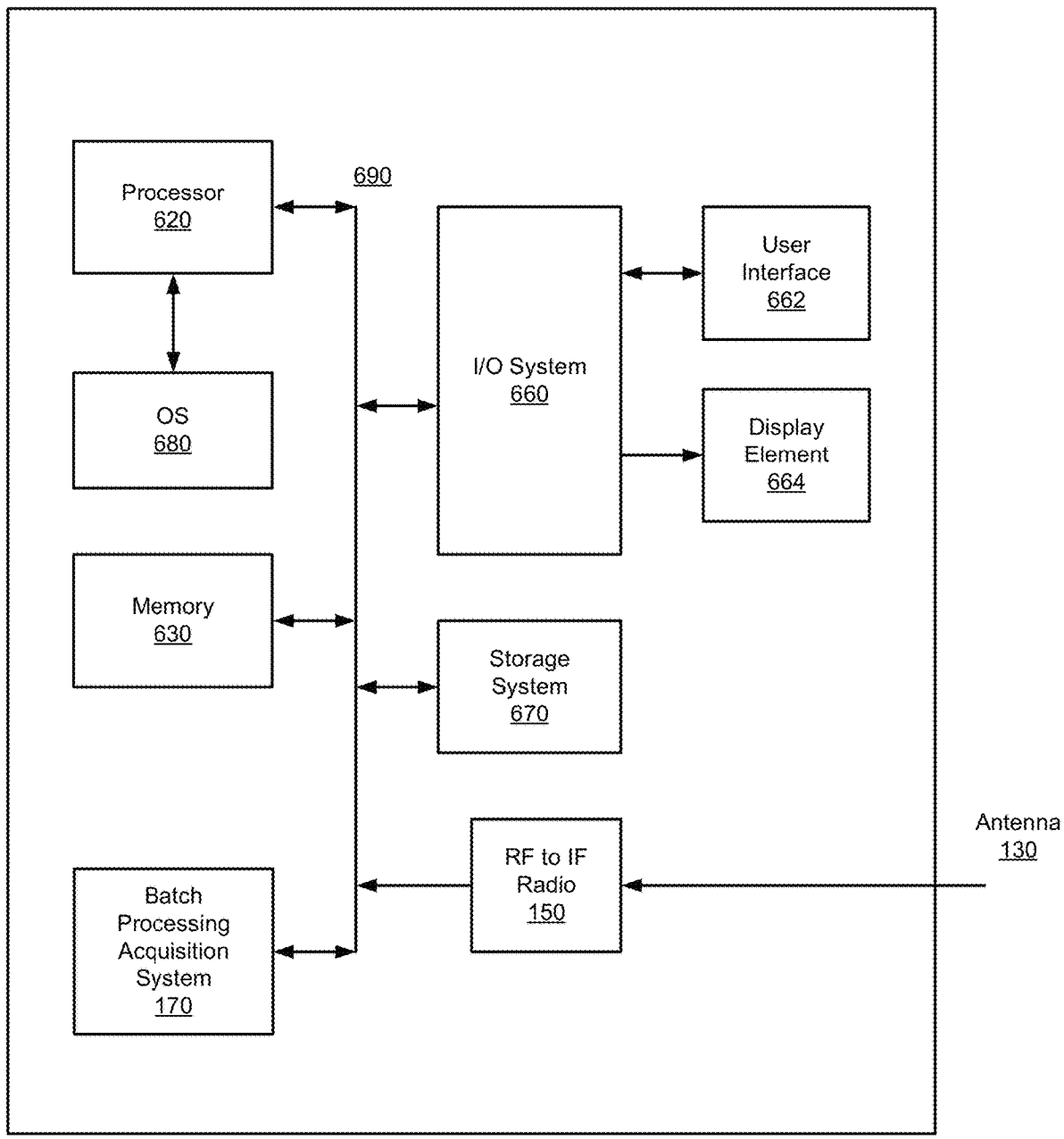
FIG. 6 is a block diagram of a platform for the batch processing signal acquisition of FIG. 1, in accordance with certain embodiments of the present disclosure.

FIG. 6 is a block diagram of a platform 600 for the batch processing acquisition system of FIG. 1, in accordance with certain embodiments of the present disclosure. In some embodiments, the platform 600, or portions thereof, may be hosted on, or otherwise be incorporated into the electronic systems of an airborne platform, a space-based platform, or a ground-based platform including data communications systems, radar systems, computing systems, or embedded systems of any sort that can benefit from acquisition of signals (including military navigation signals) with improved reliability and efficiency. The disclosed techniques may also be used in other platforms including data communication devices, personal computers, workstations, laptop computers, tablets, touchpads, portable computers, handheld computers, cellular telephones, smartphones, or messaging devices. Any combination of different devices may be used in certain embodiments.

In some embodiments, platform 600 may comprise any combination of a processor 620, a memory 630, I/O system 660, storage system 670, the batch processing acquisition system 170, and RF to IF radio 150. As can be further seen, a bus 690 is also provided to allow for communication between the various components listed above and/or other components not shown. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with sensor system platform 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multi-threaded cores in that they may include more than one hardware thread context (or "logical processor") per core. Processor 620 may be implemented as a complex instruction set computer (CISC) or a reduced instruction set computer (RISC) processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 620 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with sensor system platform 600, and therefore may also be implemented using any suitable existing or subsequently-developed systems or platforms.

I/O system 660 may be configured to interface between various I/O devices and other components of platform 600. I/O devices may include, but not be limited to, user interface 662 and display element 664. User interface 662 may include other devices (not shown) such as a touchpad, keyboard, mouse, microphone and speaker, trackball, and scratch pad. I/O system 660 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 600.

It will be appreciated that in some embodiments, some of the various components of sensor system platform 600 may be combined or integrated in a system-on-a-chip (SoC) architecture. In some embodiments, the components may be hardware components, firmware components, software components or any suitable combination of hardware, firmware or software.

Batch processing acquisition system 170 is configured to detect and acquire signals that may include non-repeating and/or encrypted patterns, (e.g., frequency hopping CDMA based GPS waveforms), as described previously. Batch processing acquisition system 170 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

Various embodiments of platform 600 may be implemented using hardware elements, software elements, or a combination of both. Examples of hardware elements may include processors, microprocessors, circuits, circuit elements (for example, transistors, resistors, capacitors, inductors, and so forth), integrated circuits, application-specific integrated circuits (ASICs, or other purpose-built semiconductors), programmable logic devices, digital signal processors, field programmable gate arrays (FPGAs), logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, causes one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments sensor system platform 600 may comprise additional, fewer, or alternative subcomponents as compared to those included in the example embodiment of FIG. 6.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate-level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some examples may be implemented, for example, using a machine-readable medium or article which may store an instruction or a set of instructions that, if executed by a machine, may cause the machine to perform a method and/or operations in accordance with an embodiment provided herein. Such a machine may include, for example, any suitable processing platform, computing platform, computing device, processing device, computing system, processing system, computer, process, or the like, and may be implemented using any suitable combination of hardware and/or software. The machine-readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, flash drives, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional structures that include hardware, or a combination of hardware and software, and may comprise, for example, singly or in any combination, hardwired circuitry, programmable circuitry such as computer processors comprising one or more individual instruction processing cores, state machine circuitry, and/or gate level logic. The circuitry may include a processor and/or controller programmed or otherwise configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable device. In any such hardware cases that include executable software, the terms "circuit" or "circuitry" are intended to include a combination of software and hardware such as a programmable device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a batch processing signal acquisition system comprising: a recording controller configured to store samples of an input signal to a memory, the input signal received at a first sampling rate; a playback controller configured to read samples from the memory for playback of the input signal at a second sampling rate; an acquisition processor configured to detect and locate, in time and frequency, a signal of interest in the playback of the input signal; and a signal processor configured to process the signal of interest in the playback of the input signal based on the detection and location provided by the acquisition processor.

Example 2 includes the system of Example 1, wherein the second sampling rate is faster than the first sampling rate by a factor in the range of 100 to 300.

Example 3 includes the system of Examples 1 or 2, wherein the signal of interest is a frequency hopping waveform and the acquisition processor is a frequency hop detector.

Example 4 includes the system of any of Example 1-3, wherein the signal processor is a code-division multiple access (CDMA) correlator configured to de-spread the signal of interest.

Example 5 includes the system of any of Example 1-4, wherein the signal of interest is a frequency hopped Global Positioning System signal.

Example 6 includes the system of any of Example 1-5, further comprising a control processor configured to: set the first sampling rate; trigger the recording controller to start storing the samples to the memory; set the second sampling rate; trigger the playback controller to start reading the samples from the memory; and coordinate operation between the playback controller, the acquisition processor, and the signal processor.

Example 7 includes the system of any of Example 1-6, wherein the first sampling rate is in the range of 5 MHz to 20 MHz, and the second sampling rate is in the range of 100 MHz to 400 MHz.

Example 8 is a computer program product including one or more non-transitory machine-readable mediums encoded with instructions that when executed by one or more processors cause a process to be carried out for batch processing signal acquisition, the process comprising: storing, by a recording controller, samples of an input signal to a memory, the input signal received at a first sampling rate; reading, by a playback controller, samples from the memory for playback of the input signal at a second sampling rate; detecting and locating, by an acquisition processor, a signal of interest, in time and frequency, in the playback of the input signal; and processing, by a signal processor, the signal of interest in the playback of the input signal based on the detection and location provided by the acquisition processor.

Example 9 includes the computer program product of Example 8, wherein the second sampling rate is faster than the first sampling rate by a factor in the range of 100 to 300.

Example 10 includes the computer program product of Examples 8 or 9, wherein the signal of interest is a frequency hopping waveform and the acquisition processor is a frequency hop detector.

Example 11 includes the computer program product of any of Examples 8-10, wherein the signal processor is a code-division multiple access (CDMA) correlator configured to de-spread the signal of interest.

Example 12 includes the computer program product of any of Examples 8-11, wherein the signal of interest is a frequency hopped Global Positioning System signal.

Example 13 includes the computer program product of any of Examples 8-12, wherein the process further comprises performing by a processor: setting the first sampling rate; triggering the recording controller to start storing the samples to the memory; setting the second sampling rate; trigger the playback controller to start reading the samples from the memory; and coordinating operation between the playback controller, the acquisition processor, and the signal processor.

Example 14 includes the computer program product of any of Examples 8-13, wherein the first sampling rate is in the range of 5 MHz to 20 MHz, and the second sampling rate is in the range of 100 MHz to 400 MHz.

Example 15 is a method for batch processing signal acquisition, the method comprising: storing samples of an input signal to a memory, the input signal received at a first sampling rate; reading samples from the memory for playback of the input signal at a second sampling rate; detecting and locating a signal of interest, in time and frequency, in the playback of the input signal; and processing the signal of interest in the playback of the input signal based on the detection and location.

Example 16 includes the method of Example 15, wherein the second sampling rate is faster than the first sampling rate by a factor in the range of 100 to 300.

Example 17 includes the method of Examples 15 or 16, wherein the signal of interest is a frequency hopping waveform and the detecting and locating is performed by a frequency hop detector.

Example 18 includes the method of any of Examples 15-17, wherein the signal of interest is a code-division multiple access (CDMA) signal, and the processing includes de-spreading the CDMA signal.

Example 19 includes the method of any of Examples 15-18, wherein the signal of interest is a frequency hopped Global Positioning System signal.

Example 20 includes the method of any of Examples 15-19, wherein the first sampling rate is in the range of 5 MHz to 20 MHz, and the second sampling rate is in the range of 100 MHz to 400 MHz.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A batch processing signal acquisition system comprising:
    a recording controller configured to store samples of an input signal to a memory, the input signal received at a first sampling rate;
    a playback controller configured to read samples from the memory for playback of the input signal at a second sampling rate;
    an acquisition processor configured to detect and locate, in time and frequency, a signal of interest in the playback of the input signal; and
    a signal processor configured to process the signal of interest in the playback of the input signal based on the detection and location provided by the acquisition processor.

2. The system of claim 1, wherein the second sampling rate is faster than the first sampling rate by a factor in the range of 100 to 300.

3. The system of claim 1, wherein the signal of interest is a frequency hopping waveform and the acquisition processor is a frequency hop detector.

4. The system of claim 1, wherein the signal processor is a code-division multiple access (CDMA) correlator configured to de-spread the signal of interest.

5. The system of claim 1, wherein the signal of interest is a frequency hopped Global Positioning System signal.

6. The system of claim 1, further comprising a control processor configured to: set the first sampling rate; trigger the recording controller to start storing the samples to the memory; set the second sampling rate; trigger the playback controller to start reading the samples from the memory; and coordinate operation between the playback controller, the acquisition processor, and the signal processor.

7. The system of claim 1, wherein the first sampling rate is in the range of 5 MHz to 20 MHz, and the second sampling rate is in the range of 100 MHz to 400 MHz.

8. A computer program product including one or more non-transitory machine-readable mediums encoded with instructions that when executed by one or more processors cause a process to be carried out for batch processing signal acquisition, the process comprising:
    storing, by a recording controller, samples of an input signal to a memory, the input signal received at a first sampling rate;
    reading, by a playback controller, samples from the memory for playback of the input signal at a second sampling rate;
    detecting and locating, by an acquisition processor, a signal of interest, in time and frequency, in the playback of the input signal; and
    processing, by a signal processor, the signal of interest in the playback of the input signal based on the detection and location provided by the acquisition processor.

9. The computer program product of claim 8, wherein the second sampling rate is faster than the first sampling rate by a factor in the range of 100 to 300.

10. The computer program product of claim 8, wherein the signal of interest is a frequency hopping waveform and the acquisition processor is a frequency hop detector.

11. The computer program product of claim 8, wherein the signal processor is a code-division multiple access (CDMA) correlator configured to de-spread the signal of interest.

12. The computer program product of claim 8, wherein the signal of interest is a frequency hopped Global Positioning System signal.

13. The computer program product of claim 8, wherein the process further comprises performing by a control processor: setting the first sampling rate; triggering the recording controller to start storing the samples to the memory; setting the second sampling rate; triggering the playback controller to start reading the samples from the memory; and coordinating operation between the playback controller, the acquisition processor, and the signal processor.

14. The computer program product of claim 8, wherein the first sampling rate is in the range of 5 MHz to 20 MHz, and the second sampling rate is in the range of 100 MHz to 400 MHz.

15. A method for batch processing signal acquisition, the method comprising:
    storing samples of an input signal to a memory, the input signal received at a first sampling rate;
    reading samples from the memory for playback of the input signal at a second sampling rate;
    detecting and locating a signal of interest, in time and frequency, in the playback of the input signal; and
    processing the signal of interest in the playback of the input signal based on the detection and location.

16. The method of claim 15, wherein the second sampling rate is faster than the first sampling rate by a factor in the range of 100 to 300.

17. The method of claim 15, wherein the signal of interest is a frequency hopping waveform and the detecting and locating is performed by a frequency hop detector.

18. The method of claim 15, wherein the signal of interest is a code-division multiple access (CDMA) signal, and the processing includes de-spreading the CDMA signal.

19. The method of claim 15, wherein the signal of interest is a frequency hopped Global Positioning System signal.

20. The method of claim 15, wherein the first sampling rate is in the range of 5 MHz to 20 MHz, and the second sampling rate is in the range of 100 MHz to 400 MHz.

\* \* \* \* \*